Dec. 1, 1942.    J. F. McWHORTER ET AL    2,303,568
RESILIENT WHEEL MOUNTING
Filed Dec. 10, 1940
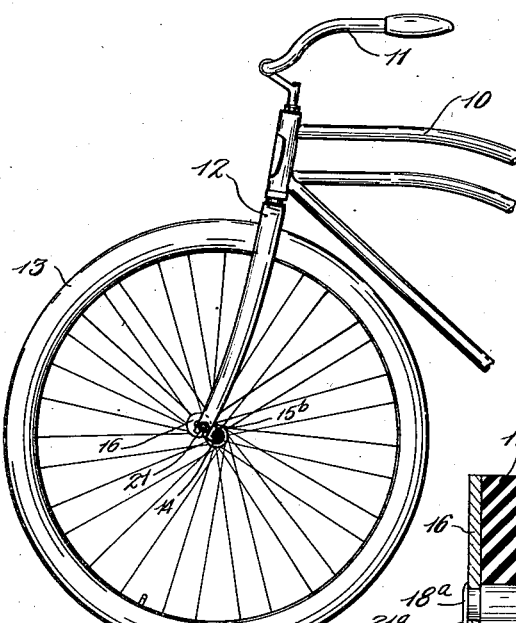
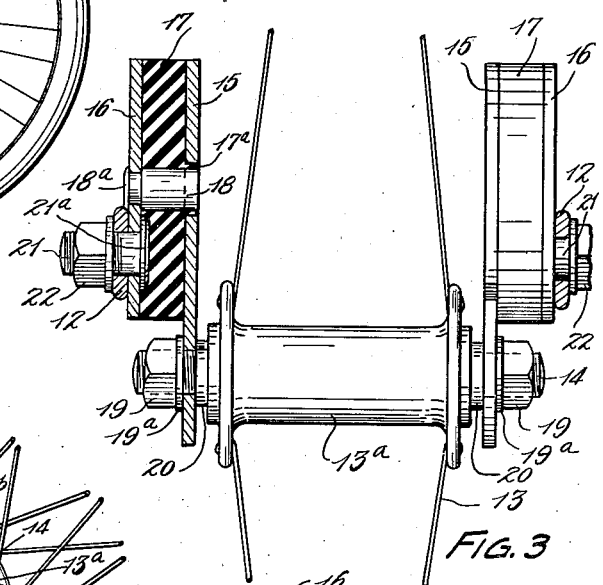
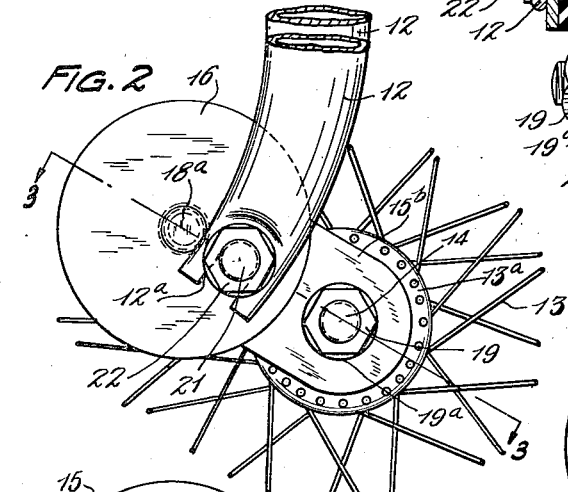
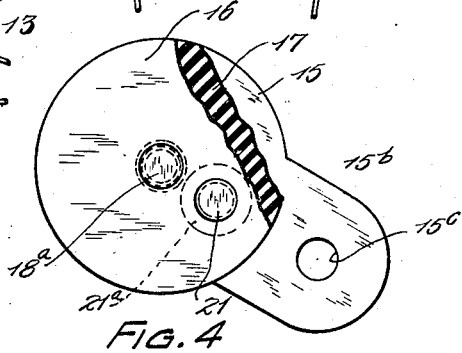
INVENTOR.
JOHN F. McWHORTER
MARION W. HUMPHREYS
BY Kwis Hudson & Kent
ATTORNEYS Patented Dec. 1, 1942

2,303,568

UNITED STATES PATENT OFFICE 2,303,568

RESILIENT WHEEL MOUNTING

John F. McWhorter, Cleveland Heights, and Marion W. Humphreys, Euclid, Ohio, assignors to The Ohio Rubber Company, Willoughby, Ohio, a corporation of Ohio Application December 10, 1940, Serial No. 369,427

3 Claims. (Cl. 280—286)

This invention relates to a resilient wheel mounting for bicycles and the like.

The principal object of the invention is to provide a resilient shock-absorbing mounting which is compact, durable, and satisfactory in operation and which utilizes rubber as the resilient medium and which is applied and functions in a novel and effective manner to dampen and absorb vibrations and shocks to which the wheel may be subjected.

The invention may be further briefly summarized as consisting in certain novel details of construction and combinations and arrangements of parts which will be described in the specification and set forth in the appended claims.

The invention has particular ability in a wheel mounting for vehicles such as bicycles, motorcycles, and the like, wherein a fork serves as the connection between the frame and the wheel, and in the accompanying sheet of drawings I have shown the invention applied to the front wheel of a bicycle, but it may be utilized also for the rear wheel and for the wheels of other types of vehicles, such as motorcycles, velocipedes, and the like.

In the accompanying sheet of drawings

Fig. 1 is a side elevation of the front part of a bicycle showing a portion of the frame and the front wheel with our improved mounting between the wheel axle and the lower end of the fork;

Fig. 2 is an enlarged side elevation of the mounting showing portions of the fork and a portion of the wheel;

Fig. 3 is a fragmentary elevation of the same, partly in section, along the line 3—3 of Fig. 2;

Fig. 4 is a side view of the mounting detached from the wheel and the fork, parts being broken away, this view looking at the outer side of the mounting; and Fig. 5 is a similar view looking at the inner side of the mounting.

Referring now to the drawing, 10 represents the frame of a bicycle, 11 the handle bars, 12 the front wheel supporting fork, and 13 the wheel, the arms of the fork straddling the wheel in the customary manner. The four parts of the bicycle designated 10 to 13 may be of usual construction. The wheel has the usual hub 13a and a wheel axle consisting of a bolt 14 between which and the hub will be the usual ball or roller bearings and bearing adjustments.

Our resilient wheel mounting is in the form of two units each of which has one part secured to one end of the axle 14 and the other part secured to one of the arms of the fork 12. Each unit consists of a pair of disk-like metal plates 15 and 16 which may be steel punchings, and an intermediate body of natural or artificial rubber, in this instance in the form of a disk 17 which is vulcanized to the inner surfaces of the metal disks 15 and 16. A good grade of semi-soft elastic rubber is employed which is vulcanized to the plates 15 and 16 and in the vulcanizing operation is strongly adhered thereto. This can be accomplished either by the use of rubber cement which is applied to the faces of the raw rubber stock or to the inner faces of the plates 15 and 16 just prior to vulcanization, or substantially the same results can be obtained by brass-plating the faces of the disks 15 and 16 to which the rubber is to adhere.

The two plates 15 and 16 of each unit, while they are free to turn and during the normal operation of the mounting do turn relative to each other, are held so as to turn relatively about a common axis by a pin 18 which in this instance is fixed to the plate 16, being secured thereto by a rivet head 18a and extends freely into a central opening 15a of the inner disk 15, see particularly Figs. 3 and 5. The pin is fixed to the disk 16 and is extended through the rubber 17 and into the opening 15a prior to the vulcanizing operation, and the pressure in the vulcanizing mold will squeeze a rather thin ring of rubber 17a into the opening 15a so as to serve as a cushion and at the same time as a centralizing medium between the inner end of the pin and the circular wall of the opening 15a. This construction holds the disks in substantial parallelism and substantially coaxial but at the same time allows the free relative angular or turning movement of one disk relative to the other.

The inner disk 15 of each unit has an arm-like extension 15b provided with an opening 15c of a size such that it can be slipped over the threaded end of the axle bolt 14. The extensions 15b of the inner disks of the two units are secured to opposite ends of the axle by nuts 19 which are screwed onto the bolt 14 and the extensions are clamped between washers 19a on the outer sides of the extensions and abutments 20 which are carried by the bolt and generally consist of the commonly employed bearing adjusting nuts. The units are thus secured to the ends of the axle preferably with the units extending diagonally forward and upward, as illustrated in Figs. 1 and 2.

The lower ends of the arms of the fork 12 are bifurcated in the usual manner, as shown at 12a in Fig. 2, and the bifurcated lower ends of the fork arms are secured to the outer disks 16 of the two units by having their lower bifurcated ends fitted over and secured to off-center studs 21 which extend laterally outward from the outer disks 16. In this instance, the studs 21 are in the form of short threaded bolts having flat heads 21a on the inner sides of the disks 16 and embedded in the rubber 17. Of course in making up the units these bolts are mounted in the disks 16 in the assembling operation preceding the vulcanizing operation. The bifurcated ends of the forks are clamped tightly against the outer sides of the disks 16 by nuts 22, washers being preferably interposed between the nuts and the bifurcated lower ends of the fork arms. Preferably the studs or bolts 21 are located between the pins 18 and the axle bolt 14, and normally, i. e., when the bicycle or other vehicle is not in use, the rubber is in repose or free of stresses of all kinds, and the axis of the stud 21 is substantially on a diagonal line between the axis of the pin 18 and the axis of the axle bolt 14, as clearly illustrated in Fig. 2.

Thus it will be seen that the lower ends of the extensions 15b of the inner disks 15 are secured to the ends of the axle bolt of the wheel and that the arms of the fork are secured to the outer disk 16 of the mounting units at a predetermined radial distance from the wheel axis so that the lower ends of the fork are offset from the axis of the axle bolt by the equivalent of a lever arm. When the bicycle or other vehicle to which our wheel mounting units are applied is in use, the shocks to which the wheel is subjected are largely absorbed by an angular or turning movement between the disks 15 and 16 of the two units, which movement is yieldingly resisted by the rubber bodies or disks 17, the relative movement between the disks 15 and 16 placing the rubber under shear or torsional load and immediately after the wheel is subjected to shock, as by striking an obstruction in the road, the shear or torsional stresses set up in the rubber turn the disks relatively in the reverse direction so as to restore them to their normal relative positions. Thus the rubber between the disks yieldingly resists this relative angular movement between the disks as the shear or torsional stresses to which the rubber is subjected are increased or decreased as the relative movements between the disks take place first in one direction and then in the other.

As stated above, the resilient means consisting in this instance of the disks 17, may be formed of natural or artificial rubber. Any of the artificial rubbers on the market, including artificial rubbers known by the trade-names Neoprene, Perbunam, Thiokol, and Koroseal, may be employed.

Our improved wheel mounting is shown applied only to the front wheel of a bicycle, but it may be applied with equal facility and effect to the rear wheel or to both wheels, and this is true also of other vehicles besides bicycles with which our invention may have utility.

While we have shown and described the preferred embodiment of our invention, it should be understood that various changes and modifications may be made, and we therefore aim in our claims to cover all modifications which do not involve a departure from the spirit and scope of the invention.

Having thus described our invention, we claim:

1. Means for resiliently mounting a wheel in a fork of a bicycle frame, comprising for each fork element two opposed parallel metal disks, a disk of resilient rubber located between and vulcanized to said metal disks, one of the metal disks having an extension by which it may be secured to the wheel axle and the other metal disk having laterally projecting means offset from the center thereof for attachment to the said fork element, and means independent of said extension and said laterally projecting means for holding said disks in substantially coaxial relation.

2. Means for resiliently mounting a wheel in a fork of a bicycle frame, comprising for each fork element two opposed parallel metal disks, a disk of resilient rubber located between and vulcanized to said metal disks, one of the metal disks having an extension by which it may be secured to the wheel axle and the other metal disk having laterally projecting means offset from the center thereof for attachment to the said fork element, and means independent of said extension and said laterally projecting means for holding said disks in substantially coaxial relation, said means consisting of an axially arranged pin extending from one metal disk through the rubber disk to the other metal disk.

3. Means for resiliently mounting a wheel in a fork of a bicycle frame, comprising for each fork element two opposed parallel metal disks, a disk of rubber located between and vulcanized to said metal disks, one of said metal disks having an extension with an opening therethrough for attachment to the wheel axle and the other metal disk having laterally projecting means positioned between the center of the disk and the opening in said extension for attachment to said fork, and an axially arranged pin extending from one metal disk through the rubber disk to the other metal disk for insuring relative arcuate movement of the metal disks.

JOHN F. McWHORTER.
MARION W. HUMPHREYS.